No. 637,243. Patented Nov. 21, 1899.
W. B. ERB.
FLUID PRESSURE MOTOR.
(Application filed Dec. 10, 1897.)
(No Model.) 2 Sheets—Sheet 1.
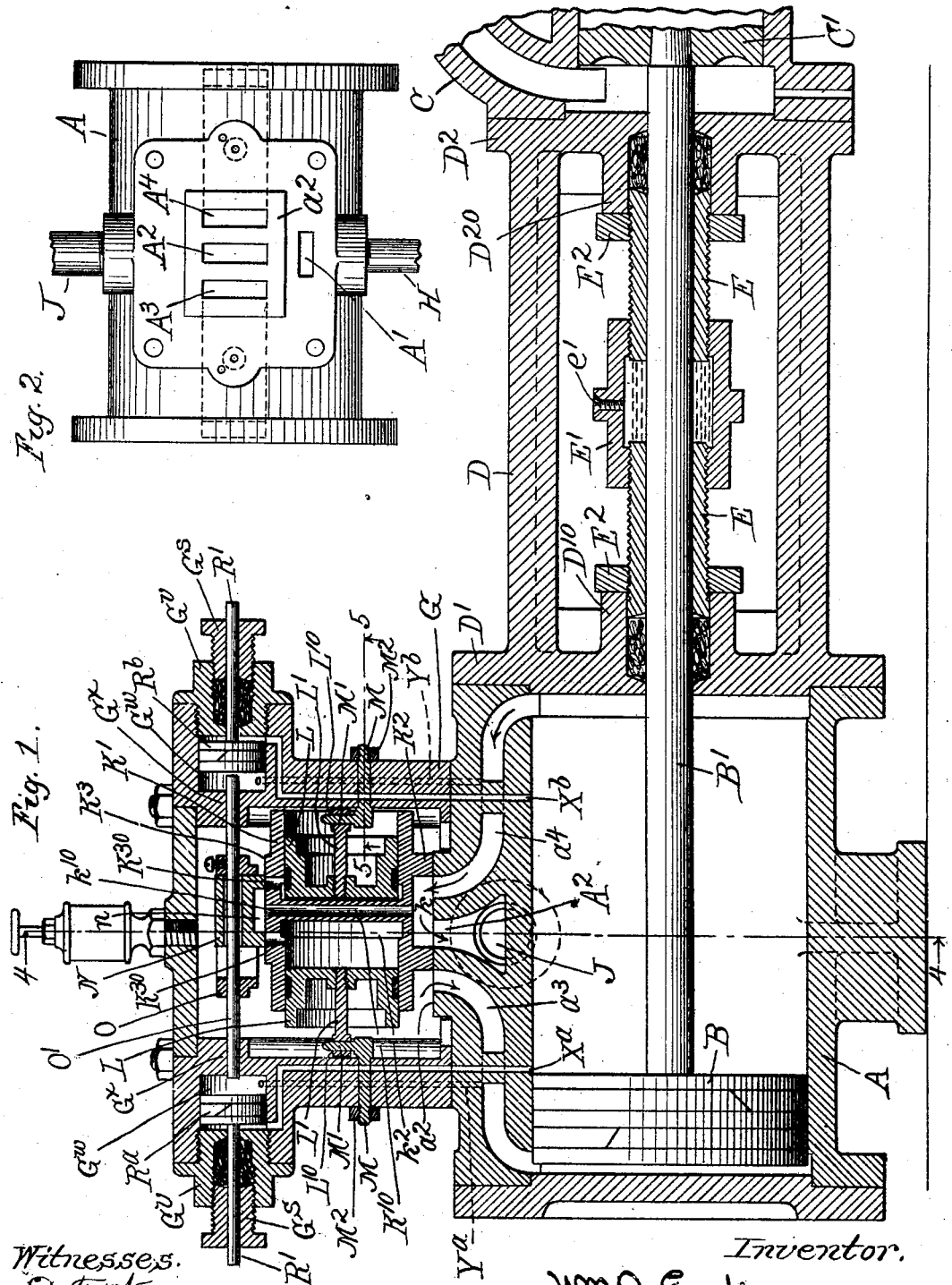

No. 637,243. Patented Nov. 21, 1899.
W. B. ERB.
FLUID PRESSURE MOTOR.
(Application filed Dec. 10, 1897.)
(No Model.) 2 Sheets—Sheet 2.
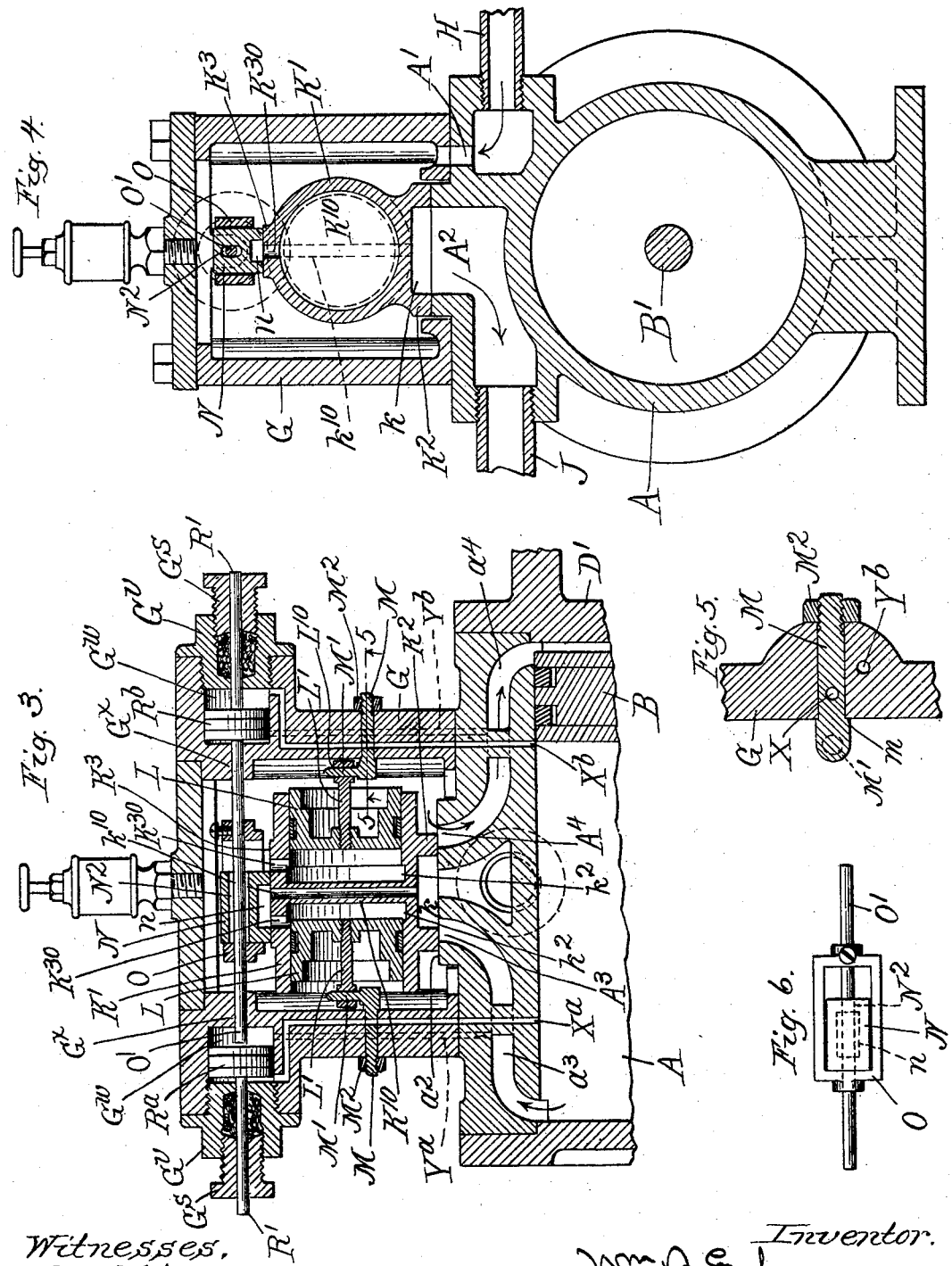
Witnesses.
E. T. Wray
Jean Elliott
Inventor.
Wm. B. Erb
by Burton and Burton
his attys

UNITED STATES PATENT OFFICE.

WILLIAM B. ERB, OF CHICAGO, ILLINOIS.

FLUID-PRESSURE MOTOR.

SPECIFICATION forming part of Letters Patent No. 637,243, dated November 21, 1899.

Application filed December 10, 1897. Serial No. 661,421. (No model.)

*To all whom it may concern:*

Be it known that I, WILLIAM B. ERB, a citizen of the United States, residing at Chicago, county of Cook, and State of Illinois, have invented certain new and useful Improvements in Fluid-Pressure Motors, which are fully set forth in the following specification, reference being had to the accompanying drawings, forming a part thereof.

In the drawings, Figure 1 is a vertical section of my improved motor in a form adapted to be directly connected with a pump-section, being axial with respect to the steam-cylinder. Fig. 2 is a top plan of the cylinder with the valve-chamber and mechanism therein detached and removed, showing the steam-ports. Fig. 3 is a detail section in the same plane as Fig. 1, showing a portion of the cylinder and the valve action and chambers, the main valve being shown in a different position from that illustrated in Fig. 1. Fig. 4 is a section at the line 4 4 on Fig. 1. Fig. 5 is a section at the line 5 5 on Figs. 1 and 3. Fig. 6 is a detail plan of the auxiliary valve and a tappet which operates it.

My improved motor belongs to the class in which the main valve is directly actuated by the pressure fluid without mechanical connections from the piston-rod.

I will describe the structure upon the assumption that steam is the fluid employed.

In the drawings, A is the cylinder; B, the piston; B', the piston rod or stem.

C' shows the piston of a pump to which the engine may be directly connected, C being the pump-body.

D is a rigid frame comprising the proximate heads of the engine-cylinder and the pump-cylinder and serving to connect the two together and having the guide-bearings $D^{10}$ $D^{20}$ on the engine and pump cylinder heads D' and $D^2$, respectively, for the piston B.

E E are exteriorly-threaded sleeves on the piston B, connected by a right and left nut E' and extending into the guide-bosses $D^{10}$ $D^{20}$ and provided with lock-nuts $E^2$ $E^2$ at the ends of said bosses, said sleeve and connecting-nut E' constituting a complete housing for the piston between the bosses $D^{10}$ and $D^{20}$, the coupling E' having sufficient cavity between the ends of the sleeves to retain a quantity of oil which may be supplied through a port closed by the screw-plug $e'$, so that the piston receives oil for both bearings as it plays through said sleeves and nut, the fibrous packing which may be supplied in the stuffing-boxes formed by the bosses $D^{10}$ $D^{20}$ at the ends of the sleeves being kept saturated by oil from the same source. The use of this expedient is possible only when the engine is so constructed as to require no mechanical connection from the piston or its stem in order to operate any of the valves, and for this reason I have shown it in connection with the valve-action which constitutes my present invention as covered in this application. The structure above described, involving the housing of the piston-rod between the pressure-fluid cylinder and the pump-cylinder and supplying oil to the piston-rod, as shown, is made the subject of my application, Serial No. 713,685, filed April 19, 1899, as a division hereof.

H is the steam-inlet pipe, and J the exhaust-pipe. The inlet leads to the port A' and the exhaust leads from the port $A^2$, the ports $A^3$ and $A^4$ being the openings at the valve-seats of the steam-passages $a^3$ and $a^4$, leading, respectively, to the opposite ends of the cylinder. The main valve slides on the seat $a^2$, through which the ports $A^2$, $A^3$, and $A^4$ open. This valve comprises a hollow cylinder K' and the rectangular boss $K^2$, whose edge constitutes the valve tread or face and which encompasses the steamway $k$, the width of which in a direction transverse to the cylinder is equal to the longer dimension of the ports $A^2$, $A^3$, and $A^4$, while its dimension in the opposite direction is equal to the distance between the proximate edges of the ports $A^3$ and $A^4$, the width or thickness of the encompassing boss being equal to the width of the ports $A^3$ and $A^4$, which are equal in width. The hollow cylinder K is partitioned by a diaphragm $K^{10}$, midway in the length of the cylinder, dividing it into two cylindrical chambers, each of which is counterbored at the bottom—that is, next to the diaphragm—at $k^2$, and through the diaphragm at the vertical diameter is formed a passage $k^{10}$, which opens at the lower end into the steamway $k$.

L L are pistons adapted to reciprocate within the chambers of the cylinder K'. They are longitudinally fixed with respect to the valvebody G and operate as pistons in said cylindrical chambers as the entire main valve reciprocates. For convenience of assembling the parts these pistons are each provided with a stem L', rooted in the inlet-head of the piston and extending beyond the outer end and having a vertical eye $L^{10}$, adapted to lodge upon a vertical pintle M' of an angle-bolt M, which is inserted from within through the wall of the valve-chamber G and secured by an exterior nut $M^2$, the angle-bolt having a faced-up shoulder $m$ and a nut being faced at the inner side, so that when tightened in place steam-tight joints are formed with the wall of the valve-chamber. This construction permits the pistons L L to accommodate themselves as to vertical position to the position of the main valve, so that the latter may accommodate itself to the seat on which it is at all times held by the steam-pressure within the valve-chamber.

At the upper side of the cylinder K' there is formed a flat seat $K^3$, and opening through said seat, one into each of the cylindrical chambers of the valves—that is, on opposite sides of the diaphragm $K^{10}$—are ports $K^{30}$ $K^{30}$. Mounted upon the flat seat $K^3$ is an auxiliary valve N, whose face is the lower edge of the rectangular boss which encompasses the steamway $n$, the length of said steamway being the distance between the ports $K^{30}$ $K^{30}$, while the width of the boss whose edge constitutes the valve face or tread is sufficient to cover said ports, respectively. This valve N is located within a rectangular frame O, whose ends constitute tappets to operate the valve, which has a play between said ends sufficiently adequate to permit the action hereinafter described. The tappet-frame O is secured on a slide rod or stem O', the valve being longitudinally apertured at $N^2$ to permit the rod to pass through it freely without touching or at least without friction. The rod O' is supported and guided in the opposite end walls of the valve-chamber at $G^x$ $G^x$, protruding through said bearings into the piston-chambers $G^w$ $G^w$, respectively, and in said chambers there are located the pistons $R^a$ $R^b$, having the stems R' R', which extend out through stuffing-boxes $G^v$ $G^v$, wherein the stems are kept steam-tight by the plugs $G^s$ $G^s$. Leading from the cylinder at points distant from the ends, respectively, far enough to be uncovered by the piston at its extreme limits are passages $X^a$ $X^b$, which lead through the wall of the cylinder and the wall of the valve-chamber G into the piston-chambers $G^w$ $G^w$, respectively, opening into said chambers at their outer ends. From the passages $a^3$ $a^4$, respectively, ducts $Y^a$ $Y^b$ lead through the wall of the cylinder and through walls of the valve-chambers into said piston-chambers $G^w$, respectively, opening laterally thereinto near the inner ends of said piston-chambers.

The operation of this structure may now be understood.

Fig. 1 shows the several moving parts at the position occupied when the piston B is about to start forward, the live steam having been admitted through the passage $a^3$ behind the piston B, the piston $R^a$ being exposed to live-steam pressure at the inner side and to exhaust-steam pressure at the outer side through the passages $Y^a$ and $X^a$, respectively, and the piston R being balanced to exhaust-steam pressure at both sides, which is admitted through the passages $X^b$ and $Y^b$, respectively, and the tappet O being held in the position shown by exposure of its stem at the left-hand end to live-steam pressure and at the right-hand end to exhaust-steam pressure only. When the piston B, approaching an inner end of the cylinder, passes and uncovers the port $X^b$, live-steam pressure is admitted outside the piston $R^b$, forcing that piston inward and causing it to move the tappet and also to laterally shift the auxiliary valve to a position on the main valve shown in Fig. 3, thus admitting live steam into the right-hand chamber and permitting exhaust from the left-hand chamber of the main valve, and such shifting of the pressure to the opposite side of the diaphragm of the valve causes the valve itself to be shifted instantly, so as to reverse the supply and exhaust connections with the cylinder. In Fig. 3 this shifting movement of the main valve is shown in progress, but not completed, having, however, progressed so far as to have brought the auxiliary valve to the left-hand limit of its play in the tappet-frame, so that the continuation of the same movement of the sleeve sufficiently to entirely uncover the passages $a^3$ and $a^4$ and completely reverse the relation of the main valve to the supply and exhaust will carry the ports $K^{30}$ of the main valve under cover of the auxiliary valve, closing the same and leaving the auxiliary valve in the same position on the main valve as in Fig. 1, while the main valve will be at the opposite extremity of its path of travel from that shown in Fig. 1. The movement of the main valve, caused by the movement of the auxiliary valve, produced by the movement of the piston $R^b$, follows instantaneously upon the movement of the piston $R^b$, and such resultant movement of the main valve, it will be noticed, instantly reverses the supply and exhaust pressure on the piston $R^b$, for by the movement of the main valve the passage $Y^b$ has been put into communication with the live steam, so that the piston $R^b$, having been moved inward to the position shown in Fig. 4, is instantly thrown back again by the resultant reversal of the steam connections to the position of this piston illustrated in Fig. 3, being stopped only for an almost-imperceptible instant. Fig. 1 shows positions of $R^a$ and $R^b$ which are occupied except for the instants at which the change of steam connections takes place.

I claim—

1. A fluid-pressure motor having a main valve directly actuated by the pressure fluid, and an auxiliary valve which controls the pressure fluid to actuate the main valve; auxiliary pistons to actuate such auxiliary valve; the cylinders for such pistons being fixed with respect to the main cylinder, and ducts leading respectively from their corresponding ends to the supply and exhaust passages which are controlled by the main valve.

2. A steam-motor having a main valve directly actuated by the steam and an auxiliary valve which controls the steam to actuate the main valve; auxiliary pistons to actuate such auxiliary valve, the cylinders for such pistons being fixed with respect to the main cylinder and ducts leading respectively from their corresponding ends to the main-cylinder steam-passages, and additional ducts leading respectively from their opposite ends directly to the main cylinder and opening therein at suitable positions to be passed and uncovered by the piston at the ends of its strokes respectively.

3. In combination with the main cylinder having the exterior valve seat and ports opening therethrough and adjacent thereto, the valve-chamber mounted on the cylinder encompassing said seat and ports, the double-chambered valve in said valve-chamber and the piston-heads adapted to operate in the chambers of said valve; said piston-heads having the stems provided with the eyes, and the valve-chamber having the pintles adapted to receive said eyes and permit movement thereon in a direction transverse to the reciprocation of the valve, whereby the main valve is permitted to accommodate itself to the seat and the pistons are permitted to accommodate themselves to the chambers of said main valve.

4. In a steam-motor, in combination with the cylinder having its main valve a slide-valve, said valve and the chamber in which it reciprocates having the one a pair of pistons and the other a pair of cylindrical chambers corresponding to said pistons; suitable supply and exhaust ports in the main slide-valve for said chambers, and an auxiliary valve which controls the same mounted on the main valve; a tappet-rod having tappets which operate the auxiliary valve with a range of lost motion less than the total travel of the main valve, auxiliary cylinders into which said tappet-rod extends, and pistons in said cylinders adapted to actuate the tappet-rod a distance sufficient to move the auxiliary valve to cover and uncover the ports, and supply and exhaust connections to said auxiliary piston-chambers arranged to admit live steam to operate said auxiliary pistons in a direction to open the auxiliary valve at each end of the main piston's travel.

In testimony whereof I have hereunto set my hand, in the presence of two witnesses, at Chicago, Illinois, this 3d day of December, 1897.

WM. B. ERB.

Witnesses:
   CHAS. S. BURTON,
   JEAN ELLIOTT.